Figure 1:
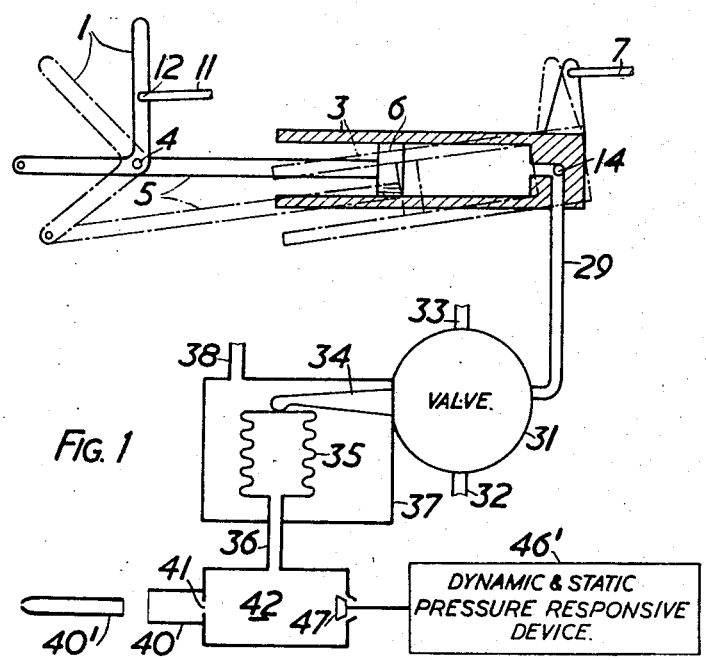

Dec. 16, 1958   R. F. CREASEY ET AL   2,864,571
ARTIFICIAL FEEL SYSTEM FOR AIRCRAFT CONTROLS
Filed Feb. 19, 1954   2 Sheets-Sheet 1

INVENTORS
R. F. CREASEY
W. D. HORSFIELD
M. W. CARA

Dec. 16, 1958   R. F. CREASEY ET AL   2,864,571
ARTIFICIAL FEEL SYSTEM FOR AIRCRAFT CONTROLS
Filed Feb. 19, 1954   2 Sheets-Sheet 2

INVENTORS
R. F. CREASEY
W. D. HORSFIELD
M. W. CARA
BY Stevens, Davis, Miller
& Mosher
ATTORNEYS

United States Patent Office 2,864,571
Patented Dec. 16, 1958

2,864,571

ARTIFICIAL FEEL SYSTEM FOR AIRCRAFT CONTROLS

Raymond Frederick Creasey, William Donald Horsfield, and Michael Woods Cara, Preston, England, assignors to The English Electric Company Limited, London, England, a British company Application February 19, 1954, Serial No. 411,338

Claims priority, application Great Britain March 10, 1953

7 Claims. (Cl. 244—83)

This invention relates to feel simulator systems for aircraft which have their control surfaces operated by servomechanisms.

The kind of feel simulator system to which the invention relates (hereinafter called a "feel simulator system of the kind described") is that in which the pilot's control member is coupled to the piston or housing of a hydraulic mechanism by a linkage having a dead centre attitude so that the said piston or housing is moved always in the same sense relative to its associated housing or piston, respectively, against hydraulic pressure, regardless of the sense in which the pilot's control member is displaced from the position corresponding to said dead centre of the linkage.

In feel simulator systems of the kind described it has been proposed to make the restoring force upon the pilot's control member vary approximately as the dynamic pressure, i. e. as the square of the aircraft speed. While this would have been suitable for the comparatively slow aircraft available at the time of conception of these earlier proposals this would lead to over-regulating in modern aircraft at high subsonic, transonic or supersonic speed of flight.

In a feel simulator system according to the present invention, the ratio of the restoring force upon the pilot's control member, for a given deflection from its neutral attitude, to the dynamic pressure, remains at a substantially constant value over a range of aircraft speeds up to nearly sonic speed and then falls off rapidly over the range of aircraft speeds through and above sonic speed.

Preferably the pressure controlling the restoring force may be derived from a pitot tube and applied through a restricted orifice to a chamber which is bled through a valve to aircraft static pressure which valve is loaded in the sense of opening by the pressure prevailing in said chamber or by the pitot pressure acting on a comparatively small area and in the sense of closing by aircraft static pressure acting on a comparatively large area. The said valve may for example be connected to a larger diameter evacuated capsule exposed externally to aircraft static pressure and containing in its interior a smaller diameter capsule in communication with the said chamber or with pitot pressure.

Figure 2:
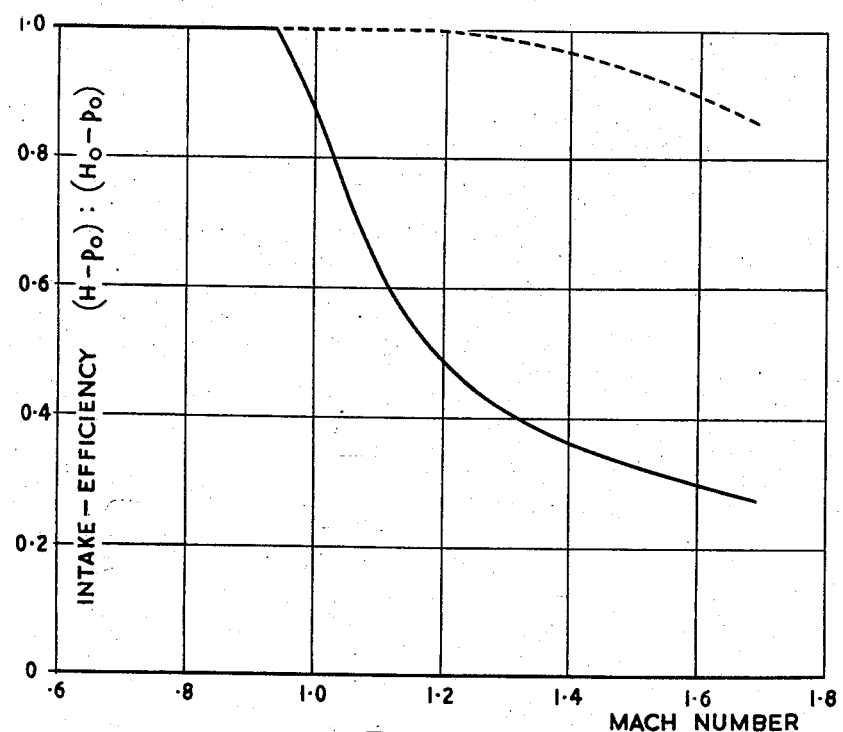
Figure 3:
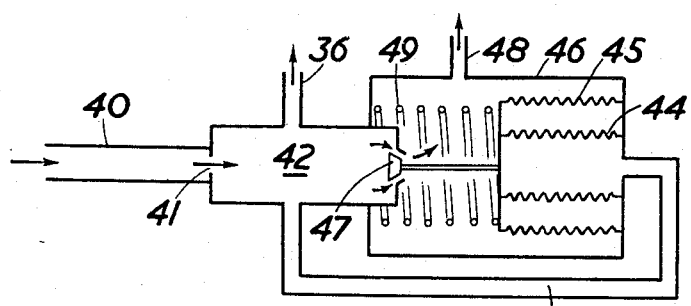
Figure 4:
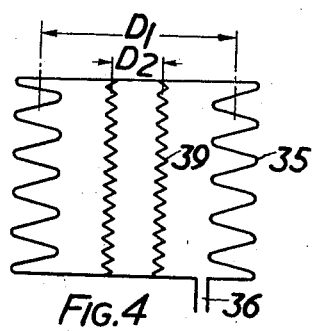

In order that the invention may be clearly understood and readily carried into effect, some embodiments thereof will now be described by way of example with reference to the accompanying drawings wherein:

Fig. 1 is a diagrammatic layout of the feel simulator system, partly in section, Fig. 2 is a graph plotting air intake efficiencies over Mach numbers, Fig. 3 is a diagrammatic section of a reduction valve arrangement reducing the efficiencies of a pitot tube at various Mach numbers to those plotted in the graph of Fig. 2, and Fig. 4 is a diagrammatic longitudinal section of a composite control capsule on a larger scale.

Referring first to the system represented by Fig. 1, the bell crank lever 1 is the pilot's control member, which is coupled to the rudder pedal, or aileron and elevator operating stick (not shown) and is also connected to control a servo motor (not shown) which operates the appropriate control surface of the aircraft. Lever 1 is pivoted to the aircraft structure at 4 and is articulated to the piston rod 5 of a piston 6 moving in a hydraulic cylinder 3 which is pivoted to the aircraft structure about a hollow pivot 14 through which it is supplied with hydraulic pressure fluid from a pipe 29. The linkage 11 to the servo motor (not shown) operating the control surface of the aircraft is articulated to the lever 1 at 12. A trimming device (not shown) may be articulated to the cylinder 3 at 7.

A pipe 32 is supplied with hydraulic pressure fluid under a pressure of say 3,000 lbs. per sq. in. from a hydraulic pump (not shown). A hydraulic reducing valve 31 controls the supply of hydraulic pressure fluid from pipe 32 to the aforesaid pipe 29, and also its discharge from said pipe 29 to a pipe 33 which leads to a sump (not shown).

The reducing valve 31 is operated by a lever 34 one end of which rests on the face of a capsule 35. This reducing valve 31 serves to vary the hydraulic pressure in pipe 29 in proportion to the pressure exerted by the capsule 35 upon the end of lever 34.

The interior of capsule 35 is connected by pipe 36 to a chamber 42 which through a restricted orifice 40 and a pipe 41 is connected to a pitot tube 40'. This chamber 42 is arranged to be bled by a valve 47 which is controlled by any suitable device responsive to dynamic and static pressure indicated as a whole by 46'.

The efficiency of an air intake can be defined relative to $H_0 - p_0$, where $H_0$ is the total head of the air stream and $p_0$ the static pressure. This, at low Mach numbers, is equal to the dynamic pressure $\frac{1}{2}\rho V^2$, wherein $\rho$ is the air density and V the true air speed.

The effective dynamic pressure $H - p_0$, of an intake is smaller than the above value $H_0 - p_0$, H being the total head recovered by the intake. The intake efficiency is then defined as:

$$\frac{H - p_0}{H_0 - p_0}$$

Fig. 2 shows two curves representing variations of this intake efficiency with Mach number. The dotted curve is that for a pitot tube, and shows that its intake efficiency remains equal to unity by the Mach number of about 1 and then drops slowly to .9 at the Mach number of about 1.6.

In a feel simulator system the restoring forces acting upon the pilot's control member for a given deflection from its neutral attitude would be undesirably high at high Mach numbers if an ordinary pitot tube were used. A substantial drop of the pressure applied to the capsule 35 of Fig. 1 at high Mach numbers is required.

In Fig. 2 the full line shows a typical desirable characteristic of intake efficiency at various Mach numbers. This characteristic shows that over the range of aircraft speeds up to about 90% of sonic speed the ratio of the restoring forces upon the pilot's control member for a given deflection from its neutral attitude to the dynamic pressure remains at substantially constant value, and when the aircraft speed is about equal to sonic speed said ratio has fallen to less than 90% of said constant value. When the aircraft speed is about 10% above sonic speed, said ratio has a value less than two-thirds of said constant value, and at an aircraft speed of about 20% above sonic speed said ratio has a value about half the said constant value. At an aircraft speed about 50% above sonic speed, said ratio has a value about one-third of said constant value.

An ordinary pitot tube 40' may be used with a device 46' such as is shown diagrammatically in Fig. 1. Such a device is shown more specifically in Fig. 3. The pitot tube (not shown in Fig. 3) is connected by a pipe 40 and a restricted orifice 41 to a chamber 42 from which the pipe 36 leads to the interior of the capsule 35 of Fig. 1. The chamber 42 is also connected by a pipe 43 to the interior of a capsule 44 arranged within an evacuated capsule 45. A chamber 46, within which capsule 45 is placed, is connected to a source of static pressure by a pipe 48 and to the chamber 42 by a valve 47 which is controlled by the combined capsules 44, 45. Spring 49 loads the capsules 44, 45 in the sense of tending to close valve 47.

Valve 47 opens when the pressure in the capsule 44 and any resilient forces of the capsules 44, 45 overcome the static pressure on the capsule 45 and any restraint by the force of spring 49. The opening of valve 47 allows an air flow from pipe 40 to pipe 48 which is throttled by the restricted orifice 41 so that the pressure supplied to capsule 35 of Fig. 2 is reduced below that in the pitot tube. The Mach number at which the valve 47 opens depends basically on the ratio of the areas of capsules 44 and 45, and for any given pair of capsules 4 also upon the force applied by spring 49 when valve 47 is shut.

The characteristics of the device, when the valve 47 is opened, depend on the geometry and the spring rates of the capsules 44, 45 themselves and of the spring 49. Appropriate dimensions can be selected to attain an efficiency characteristic as represented by the full line curve in Fig. 2.

Fig. 4 shows an alternative arrangement in which an evacuated capsule 39 is arranged inside the said capsule 35, the mean diameter $D_2$ of capsule 39 being substantially smaller than the mean diameter $D_1$ of capsule 35. This capsule 39 is evacuated and prestressed in compression so that it acts by its own resiliency as a compression spring from inside on the end faces of the capsule 35.

For example, for a feel simulator device used in conjunction with tail plane or rudder control, a plain capsule 35 has been used, i. e. without additional spring loaded evacuated capsule.

For aileron control an evacuated capsule 39 could be used having an area of say one fourth of the main capsule 35, and spring loaded to produce a loading corresponding to an effective pressure of 20 lbs. per square inch inside the said evacuated capsule.

By the use of an evacuated capsule 39 the device 37 as a whole is made responsive to dynamic and static pressure, the effect of static air pressure as compared with that of dynamic pressure being the greater, the larger is the evacuated capsule 39 in proportion to the main capsule 35.

What we claim as our invention and desire to secure by Letters Patent is:

1. A feel simulator system for aircraft having control surfaces operated from the pilot's control member through servo-mechanism comprising in combination; a dead center mechanism, operatively connected to the pilot's control member and aircraft structure, including a cylinder and a piston arranged in and movable relative to the said cylinder against hydraulic pressure applying a restoring force to the pilot's control member towards a neutral position, a reducing valve arranged between the said cylinder and an external source of higher hydraulic pressure and drain, respectively, a resilient control capsule in positive operative contact with the said valve in the sense of operating the same to reduce the hydraulic pressure from said external source transmitted to the said cylinder to a pressure depending on the force supplied by said control capsule, the said capsule being exposed from one side to static air pressure and from the other side to a pressure derived from dynamic pressure, pressure controlling means responsive to dynamic pressure and static air pressure maintaining the pressure derived from dynamic air pressure acting on said capsule substantially proportional to dynamic pressure over a range of aircraft speeds up to nearly sonic speed, and reducing the ratio of said pressure to dynamic pressure rapidly over a range of aircraft speeds through and above sonic speed, and a second resilient capsule of smaller cross section area than and fitted in a pre-compressed state inside the said resilient control capsule, bearing from inside on the end faces of the said control capsule, the said second resilient capsule being evacuated.

2. A feel simulator system for aircraft having control surfaces operated from the pilot's control member through servo-mechanism comprising in combination: a dead center mechanism, operatively connected to the pilot's control member and aircraft structure, including a cylinder and a piston arranged in and movable relative to the said cylinder against hydraulic pressure applying a restoring force to the pilot's control member towards a neutral position, a reducing valve arranged between the said cylinder and an external source of higher hydraulic pressure and drain, respectively, a resilient control capsule in positive operative contact with the said valve in the sense of operating the same to reduce the hydraulic pressure from said external source transmitted to the said cylinder to a pressure depending on the force supplied by said control capsule, the said capsule being exposed from one side to static air pressure and from the other side to a pressure derived from dynamic pressure, and pressure controlling means including a pitot tube, a chamber, a restricted orifice connecting the said chamber with the said pitot tube, a casing vented to static pressure arranged adjacent said chamber, a valve when open connecting the said chamber with the said casing, an evacuated resilient capsule arranged inside said casing and operatively connected to said valve the pressure in said casing tending to close said valve, and a smaller diameter resilient capsule arranged within the said evacuated capsule and abutting on the end faces thereof from inside and in communication with the said chamber, the pressure inside said smaller capsule tending to open said valve, the said chamber being in communication with the said resilient control capsule.

3. In an airplane control system in an airplane including a pilot's control element, an enclosed force producing diaphragm communicating on one side thereof with static pressure, the other side of said diaphragm communicating with a source of ram air pressure when said airplane is in flight, linkage connecting said diaphragm with said control element to impose thereon a force representing a differential ratio between said static pressure and said ram air pressure when said control element is moved from a neutral position; a normally closed valve connected between each side of said diaphragm, said valve being operable in accordance with ram air pressure modified by static air pressure to communicate one side of said diaphragm with the other side thereof when said ram air pressure exceeds a predetermined value.

4. In an airplane control system in an airplane, including a pilot's control element, an enclosed force producing diaphragm communicating on one side thereof with static pressure, the other side of said diaphragm communicating with a source of ram air pressure when said airplane is in flight, and linkage connecting said diaphragm with said control element to impose thereon a force representing a differential ratio between said static pressure and said ram air pressure when said control element is moved from a neutral position; a valve body connected between each side of said diaphragm, a normally closed passage through said valve body and communicating with each side of said diaphragm, and pressure movable means mounted in said valve body to control the opening and closing of said passage, being operable in accordance with ram air pressure modified by static air pressure to open said passage when said ram air pressure exceeds a predetermined value.

5. In an airplane control system in an airplane including a pilot's control element, an enclosed force producing diaphragm communicating on one side thereof with static pressure, the other side of said diaphragm communicating with a source of ram air pressure when said airplane is in flight, linkage connecting said diaphragm with said control element to impose thereon a force representing a differential ratio between said static pressure and said ram air pressure when said control element is moved from a neutral position; means for maintaining said force substantially constant at airspeeds above a predetermined Mach number comprising a normally closed passage communicating at one end thereof with the static air pressure side of said diaphragm, the other end of said passage communicating with the ram air pressure side of said diaphragm, and valve means responsive to dynamic variations in said ram air pressure modified by said static air pressure to open said normally closed passage when said ram air pressure exceeds a predetermined value.

6. In an airplane control system in an airplane including a pilot's control element, an enclosed force producing diaphragm communicating on one side thereof with static pressure, the other side of said diaphragm communicating with a source of ram air pressure when said airplane is in flight, linkage connecting said diaphragm with said control element to impose thereon a force representing a differential ratio between said static pressure and said ram air pressure when said control element is moved from a neutral position; means for maintaining said force at a constant value at flight speeds above a predetermined Mach number comprising a passage between each side of said diaphragm to communicate one side thereof with the other, valve means normally closing said passage, static pressure responsive means for exerting a force proportional to the static pressure condition on the appropriate side of said diaphragm against said valve member, said valve member being movable against said static pressure force in response to increase in ram air pressure to open said passage when said ram air pressure exceeds a predetermined value.

7. In an airplane control system in an airplane including a pilot's control element, an enclosed force producing diaphragm communicating on one side thereof with static pressure, the other side of said diaphragm communicating with a source of ram air pressure when said airplane is in flight, linkage connecting said diaphragm with said control element to impose thereon a force representing a differential ratio between said static pressure and said ram air pressure when said control element is moved from a neutral position; a valve body connected between each side of said diaphragm, a passage extending through said valve body, the opening at one end of said passage communicating with one side of said diaphragm and the opening at the other end of said passage communicating with the other side of said diaphragm, a valve poppet movable in accordance with dynamic variations in said ram air pressure to open and close said end of said passage in communication with said ram air pressure, and modification means responsive to static air pressure and connected to exert a modifying force upon said ram air pressure movable valve poppet to control the opening and closing of said passage.

References Cited in the file of this patent
UNITED STATES PATENTS

| | | |
|---|---|---|
| 2,445,343 | Tyra | July 20, 1948 |
| 2,628,793 | Stalker | Feb. 17, 1953 |
| 2,638,289 | McKellar | May 12, 1953 |
| 2,724,565 | Trevaskis | Nov. 22, 1955 |